United States Patent [19]
Yung et al.

[11] Patent Number: 5,931,945
[45] Date of Patent: *Aug. 3, 1999

[54] GRAPHIC SYSTEM FOR MASKING MULTIPLE NON-CONTIGUOUS BYTES HAVING DECODE LOGIC TO SELECTIVELY ACTIVATE EACH OF THE CONTROL LINES BASED ON THE MASK REGISTER BITS

[75] Inventors: Robert Yung; Leslie D. Kohn, both of Fremont; Timothy J. Van Hook, Atherton, all of Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/630,830

[22] Filed: Apr. 10, 1996

Related U.S. Application Data

[63] Continuation-in-part of application No. 08/236,572, Apr. 29, 1994, Pat. No. 5,734,874.

[51] Int. Cl.$^6$ ............................. G06F 13/10; G06F 12/08
[52] U.S. Cl. ......................... 712/898; 712/224; 711/122; 711/159
[58] Field of Search ..................... 395/898, 449, 395/565, 250, 486; 712/224; 711/122, 159

[56] References Cited

U.S. PATENT DOCUMENTS

| | | | |
|---|---|---|---|
| 3,820,078 | 6/1974 | Curley | 395/250 |
| 5,193,167 | 3/1993 | Sites et al. | 395/490 |
| 5,357,267 | 10/1994 | Inoue | 345/201 |
| 5,506,980 | 4/1996 | Inagami et al. | 395/486 |

OTHER PUBLICATIONS

Patterson et al. [Computer Architecture a Quantitative Approach] pp. 460–469, 1990.
DEC [Alpha Architecture Handbook] pp. A–13 to A–18, 1994.
T. I. (TMS32010 User's Guide) pp. 3–7, 1983.

*Primary Examiner*—Meng-Ai T. An
*Assistant Examiner*—Gautam R. Patel
*Attorney, Agent, or Firm*—Townsend & Townsend and Crew LLP

[57] ABSTRACT

A partial store instruction and associated logic for storing selected bytes of a group of bytes in a register to a designated memory location. A mask in a separate register is used to enable particular bytes to be written, with only enabled bytes being written to the final location. The mask can be previously generated as a result of a comparison or other operation. The creation of the mask and the execution of a partial store instruction can also be used as a prefetch instruction, eliminating the need for a separate opcode for a prefetch.

10 Claims, 4 Drawing Sheets

| | 7 | 6 | 5 | 4 | 3 | 2 | 1 | 0 | } BYTE ENABLE |
|---|---|---|---|---|---|---|---|---|---|
| PST 8 | 7 | 6 | 5 | 4 | 3 | 2 | 1 | 0 | } MASK BIT |
| PST 16 | 3 | 3 | 2 | 2 | 1 | 1 | 0 | 0 | |
| PST 32 | 1 | 1 | 1 | 1 | 0 | 0 | 0 | 0 | |
FIG. 5.
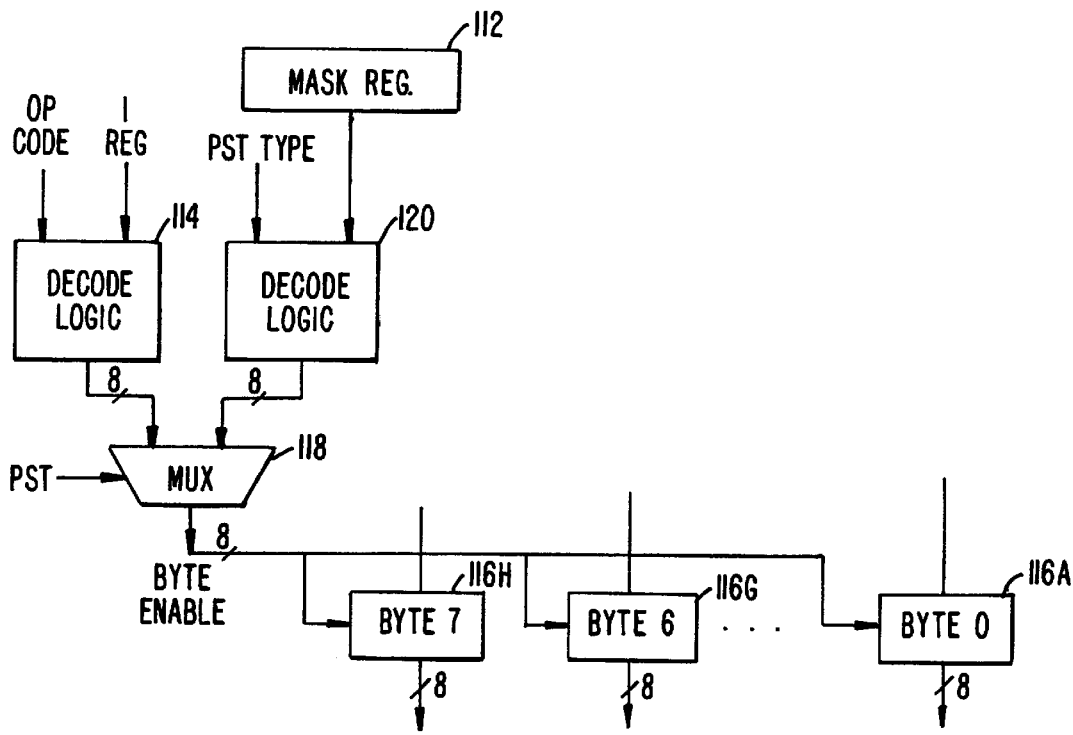
FIG. 6.
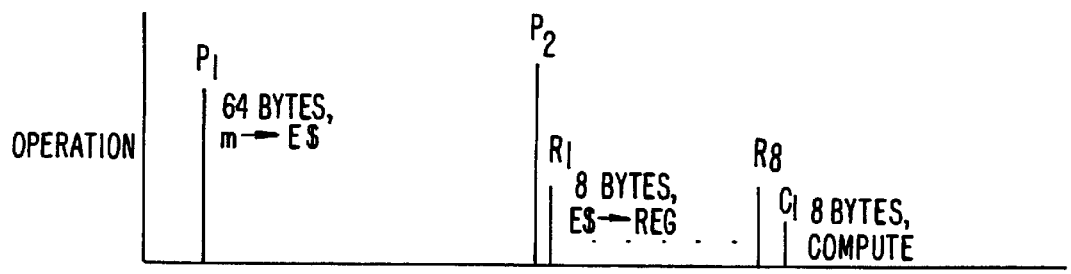
FIG. 7.

GRAPHIC SYSTEM FOR MASKING MULTIPLE NON-CONTIGUOUS BYTES HAVING DECODE LOGIC TO SELECTIVELY ACTIVATE EACH OF THE CONTROL LINES BASED ON THE MASK REGISTER BITS

This application is a continuation-in-part of application Ser. No. 08/236,572, filed Apr. 29, 1994, now U.S. Pat. No. 5,734,872 entitled "A CPU WITH INTEGRATED GRAPHICS FUNCTIONS."

FIELD OF THE INVENTION

The present invention relates to fetching and storing operations in a microprocessor, and in particular to a superscalar central processing unit (CPU) having integrated graphics capabilities.

BACKGROUND OF THE INVENTION

The end result of most graphics applications is the generation of an image on a display or piece of paper. The basic elements of the image are the individual pixels and the location of each pixel. Thus, the basic values manipulated by a processing system are representations of the pixels and their locations, or addresses.

A typical representation of a pixel for a computer display uses RGB (red, green, blue) format. In this format, multiple bits for each of the R, G and B values indicates the intensity of the red, green and blue guns on the CRT. The combination of the different intensities gives the desired colors. In an alternate format, rather than specifying the intensity of each gun directly, the values could be used to index into a color look-up table (LUT) which then provides the desired intensity value for each gun of a CRT. One typical format uses 8 bits for each of the R, G and B values. In some formats, another field, called alpha (a) is used to represent either the transparency or relative coverage of an object over the pixel for 3-D applications. In 3-D applications, depending on the viewpoint, which pixel at of a particular X, Y location is to be displayed must be chosen amongst a number of planes of pixels in the Z plane. If a pixel in front is relatively transparent, the pixel behind might be allowed to show through, giving some combination of the colors of the two pixels.

Alternate types of pixel representations are used. For instance, CYM (cyan [light blue], magenta [purplish-red], and yellow) are typically used for printers, with a subtractive operation between the intensities, rather than additive as for RGB. Yet another representation, YUV, is used to give a luminance value and two values of chroma, and was developed for broadcast television to be compatible with black and white TVs which only have a luminance value. Black and white monitors use a grey scale, which is specified by the intensity of each pixel.

The display of an image in graphics processing requires producing the appropriate pixel values for each pixel at each address in a frame buffer, which stores information to be displayed on the screen. The pixel values at each location in the frame buffer may be created by various rendering techniques, which are the operations for creating the image in the frame buffer. Rendering will typically use a number of primitives, which are basic building blocks of the pictures, such as points, lines, polygons, circles, etc.

For 3-D images, additional factors include the particular viewpoint used, with appropriate lighting effects, such as shading and reflection. In addition, particular objects may be colored or textured to make them more realistic. The lighting and shading effects are accomplished by varying the intensities of the individual pixels in the area to be shaded or have a reflection. This typically involves, at the processing level, the multiplication of pixel values by a constant. This is one example of a graphics intensive operation in which many pixels may be required to be multiplied by the same or varying constants.

In 3-D graphics, an image is generated in three dimensions. This is stored in memory as an X, Y plane representing the first face of a cube, with a series of slices through the cube representing different Z positions, each having its own X, Y plane representation. When viewing the image on the display, the viewpoint must be selected to determine which X, Y plane is visible at any particular viewpoint. This typically involves a comparison operation in which the pixels' Z positions are compared to each other to determine which to put in the frame buffer for display. In addition, the pixel position may be compared to the viewpoint z position. Thus, extensive comparison operations are another attribute of graphics manipulation.

In addition to determining which image is in front for 3-D applications, images may be clipped for a variety of reasons. For instance, if a triangle is partially behind a square, it may be most efficient to render the triangle, then render the square, and clip the triangle where it is hidden by the square. In addition, windows may be generated, or the edge of a screen may vary depending upon the scale of an image to be displayed, thus creating additional boundaries where an image must be cut off. Thus, it is often necessary to compare a particular pixel position, or address, to an edge boundary or clipping position.

In video graphics, there are additional complications for processing images. In particular, a large number of different images must be generated very rapidly, thus requiring fast throughput plus large amounts of memory. Compression techniques are thus very important in eliminating the amount of memory. One such compression technique involves motion estimation. In movement from one frame to another, often most of the image will not change, with only a portion moving. The portion moving, or the whole if it is moving, often will typically be shifted, and thus storage can be saved by indicating the amount of shift rather storing a whole new image. The amount of movement is typically determined by comparing a block of pixels in one image to those in another image frame, and moving the positions of the blocks around relative to each other until a best match is obtained.

Other considerations in video include the need to deal with images in multiple formats, and the need to convert one format into another to make it compatible with other images.

There are three major barriers to achieving high performance in graphics computer systems. The first barrier is in floating point processing throughput. Graphics applications typically perform large amount of figure manipulation operations such as transformations and clippings using floating point data. The second barrier is in integer or fixed point processing throughput. Graphics applications also typically perform large amount of display operations such as scan conversion and color interpolation using integer or fixed point data. The third barrier is in memory references. The above-described operations typically require large amount of memory references for reading from and writing into, for example, the frame and Z-buffers.

Historically, the CPU's in early prior art computer systems are responsible for both graphics as well as non-graphics functions. No special hardware are provided to assist these early CPUs in performing the large amount of floating and fixed point processing, nor memory references. While the designs of these early prior art computer systems are simple, their performance are typically slow.

Some later prior art computer systems provide auxiliary display processors. The auxiliary display processors would off load these later CPUs from some of the display related operations. However, these later CPUs would still be responsible for most of the graphics processing. Typically, the bandwidth of the system buses of these later prior art computer systems are increased correspondingly to accommodate the increased amount of communications between the processors over the buses. The auxiliary display processors may even be provided with their own memory to reduce the amount of memory contentions between the processors. While generally performance will increase, however, the approach is costly and complex and may not be scalable.

Other later prior art computer systems would provide auxiliary graphics processors with even richer graphics processors would off load the CPUs of these later prior art computer systems from most of the graphics processing. Under this approach extensive dedicated hardware as well as sophisticated software interface between the CPUs and the auxiliary graphics processors will have to be provided. While performance will increase even more, however, the approach is even more costly and more complex than the display processor approach.

In the case of microprocessors, as the technology continues to allow more and more circuitry to be packaged in a small area, it is increasingly more desirable to integrate the general purpose CPU with built-in graphics capabilities instead. Some modern prior art computer systems have begun to do that. However, the amount and nature of graphics functions integrated in these modern prior art computer systems typically are still very limited. Particular graphics functions known to have been integrated include frame buffer checks, add with pixel merge, and add with Z-buffer merge. Much of the graphics processing on these modern prior art systems remain being processed by the general purpose CPU without additional built-in graphics capabilities, or by the auxiliary display/graphics processors.

The performance of a CPU in doing graphics operations may be affected by the structure of the CPU itself. For instance, most modern CPUs employ a cache memory and a TLB (translation look-aside buffer). The cache memory is a small memory storing frequently accessed instructions or data by a computer program. This is based on the realization that many applications programs do loops or repeatedly access data which is in proximity to each other. Thus a speed savings can be achieved by having a small amount of data and instructions on the microprocessor chip itself or an external, dedicated cache which is more quickly accessed than main memory. However, in graphics functions, the cache size may be overwhelmed in processing a large image. The TLB is a small cache of page translations from a virtual address used by a program to a physical address in memory, and misses may occur more often for graphics operations because of the amount of data that needs to be addressed.

In RISC (reduced instruction set computing) processors a superscalar approach is used in which multiple, relatively simple, instructions are executed in parallel. This requires a number of parallel execution units for performing these instructions. In addition, these processors are typically pipelined, with each instruction entering the pipeline to be followed by another instruction, and thus multiple instructions are being processed in the pipeline at the same time. Accordingly, the design of the processor requires that the execution units and pipelines be constructed so that it is unlikely that any two sequential instructions will require the same execution unit, thus not allowing them to be issued in parallel.

One implementation of a RISC microprocessor incorporating graphics capabilities is the Motorola MC88110. This microprocessor, in addition to its integer execution units, and multiply, divide and floating point add units, adds two special purpose graphics units. The added graphics units are a pixel add execution unit, and a pixel pack execution unit. The Motorola processor allows multiple pixels to be packed into a 64-bit data path used for other functions in the other execution units. Thus, multiple pixels can be operated on at one time. The packing operation in the packing execution unit packs the pixels into the 64-bit format. The pixel add operation allows the adding or subtracting of pixel values from each other, with multiple pixels being subtracted at one time in a 64-bit field. This requires disabling the carry normally generated in the adder on each 8-bit boundary. The Motorola processor also provides for pixel multiply operations which are done using a normal multiply unit, with the pixels being placed into a field with zeros in the high order bits, so that the multiplication result will not spill over into the next pixel value representation.

The Intel I860 microprocessor incorporated a graphics unit which allowed it to execute Z-buffer graphics instructions. These are basically the multiple operations required to determine which pixel should be in front of the others in a 3-D display.

The present invention addresses two areas where complications arise in providing native graphics capability in a CPU. One area is the computation intensive operation of determining which images in a 3-D image are to be displayed on the screen. This is done on a pixel by pixel basis by comparing which pixel is in front of the other from the viewpoint selected, and writing that pixel which is in front to the frame buffer for display. This computation involves loading the Z or depth value of each pixel and comparing the depth values of two pixels to each other. If the depth value of the current pixel is less than the next pixel (i.e., this pixel is in front of the other pixel), a branch is made to write the current pixel to the frame buffer (and its depth to the Z-buffer), and a return is made to the comparison sequence. Such a computation is especially time consuming since the data representing pixel depth have a limited number of bits, and thus the large data paths of modern microprocessors are largely wasted on a single pixel.

An additional complication with graphics capability in a general purpose CPU is the proliferation of opcodes. Typically, a fixed bit field is established for all the opcodes for a microprocessor. As more and more specific graphics operations are added, the number of available opcodes is rapidly used up, and the decode logic for the opcode becomes increasingly complex. Accordingly, it is desirable to minimize the number of opcodes with such additional capability, which is in conformance with the philosophy behind superscalar architecture.

SUMMARY OF THE INVENTION

The present invention is directed to a partial store instruction and associated logic for storing selected bytes of a group of bytes in a register to a designated memory location. A mask in a separate register is used to enable particular bytes to be written, with only enabled bytes being written to the final location. The mask can be previously generated as a result of a comparison or other operation. In one embodiment, the bytes represent pixels.

The creation of the mask and the execution of a partial store instruction can also be used as a prefetch instruction, eliminating the need for a separate opcode for a prefetch. If all the bits of the mask are set to non-enabling status, the subsequent partial store operation will attempt to store no data to a specified address. When that address is not present in cache memory, the result for an allocating cache will be to fetch the data at that address into the cache line so that it is available to be read or written to later. Since nothing is written to it, the end effect is to simply prefetch the desired data into the cache. Such a prefetch operation is particularly useful for graphics applications, where an image is being processed in a regular manner, such that the data needed next, usual used once in a pass, can be predicted and prefetched ahead of time to eliminate microprocessor stalls. The partial store used as a prefetch is thus predicated execution, with the mask being a conditional variable, or predicate, which determines whether anything is actually fetched into memory.

In a preferred embodiment, the present invention is incorporated into a microprocessor with an on-chip, first-level cache which is a write-through cache and non-allocating. A second-level, external cache is provided which is allocating. Thus, upon a miss to the first-level cache, nothing occurs except that the write is forwarded to the second-level cache. Upon a miss in the second-level cache, a fetch is done into the second-level cache from main memory or a higher level cache, since the second-level cache is allocating. The result is a prefetch into the second-level cache.

When it is not used as a prefetch instruction, the partial store instruction, with the use of a mask according to the present invention, eliminates the need for multiple iterations for pixel comparisons and subsequent branches for pixel stores. This is because multiple pixels can be compared in parallel, and multiple, selected pixels can be written in parallel, based on a mask generated from the comparison. In addition, the present invention allows the same instruction to be used for a prefetch operation to improve memory accessing speed without increasing the number of opcodes and required decode logic in the microprocessor.

For a fuller understanding of the nature and advantages of the invention, reference should be made to the following description taken in conjunction with the accompanying drawings.

BRIEF DESCRIPTION OF THE DRAWINGS

FIG. 5 is a table setting forth the mask bits for different byte enable bytes for different data formats according to one embodiment of the invention;

FIG. 6 is a block diagram of the decoding logic according to one embodiment of the invention for providing byte enable signals in response to a mask and partial store instruction; and FIG. 7 is a timing diagram illustrating the timing of a partial store as a prefetch instruction in an operation sequence according to one embodiment of the invention.

DESCRIPTION OF THE PREFERRED EMBODIMENT

Figure 1:
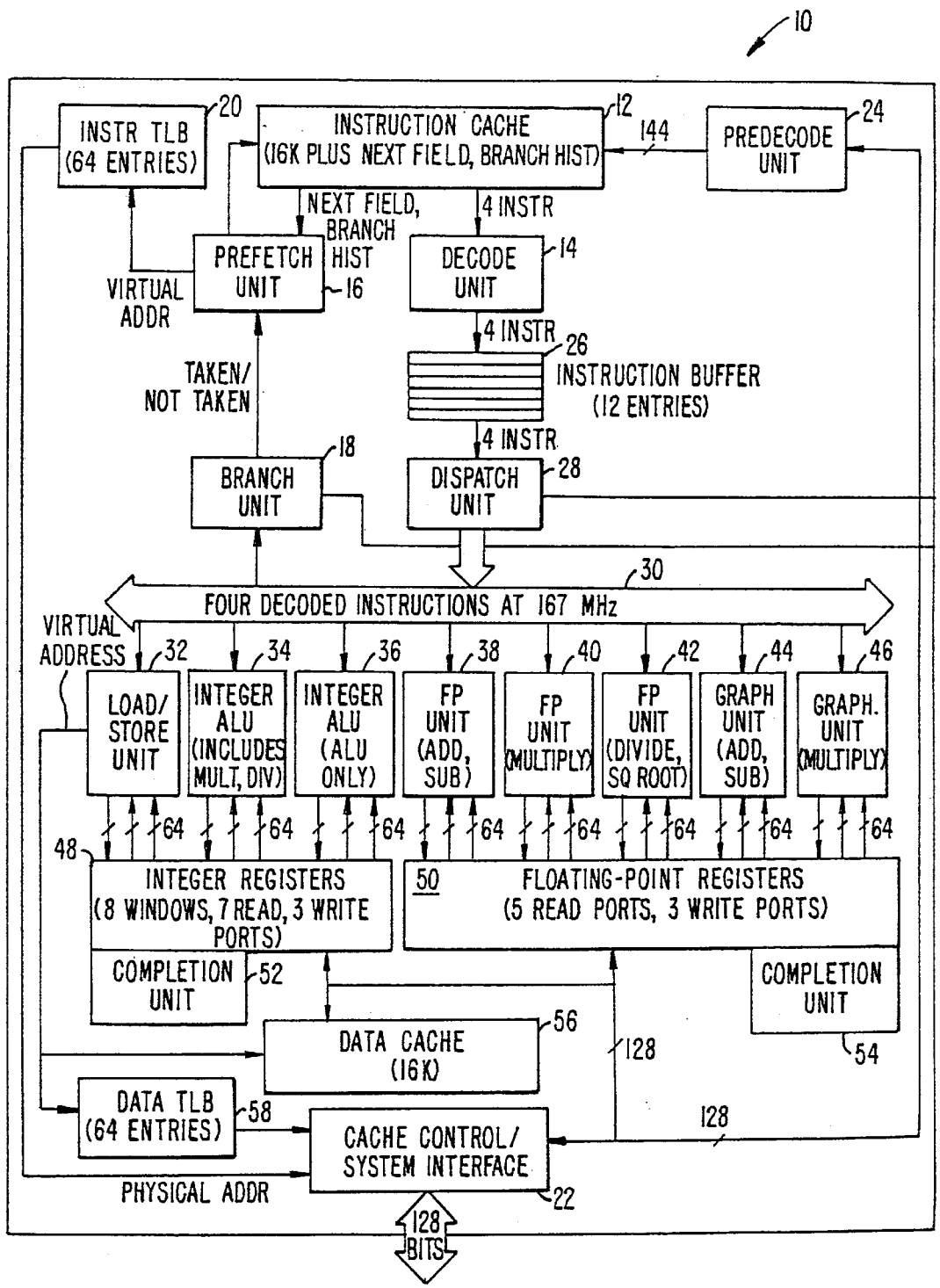
FIG. 1 is a block diagram of a microprocessor modified to incorporate an embodiment of the present invention.

FIG. 1 is a block diagram of an UltraSparc™ microprocessor 10, modified to incorporate the present invention. An instruction cache 12 provides instructions to a decode unit 14. The instruction cache can receive its instructions from a prefetch unit 16, which either receives instructions from branch unit 18 or provides a virtual address to an instruction TLB (translation look-aside buffer) 20, which then causes the instructions to be fetched from an off-chip cache through a cache control/system interface 22. The instructions from the off-chip cache are provided to a pre-decode unit 24 to provide certain information, such as whether it is a branch instruction, to instruction cache 12.

Instructions from decode unit 14 are provided to an instruction buffer 26, where they are accessed by dispatch unit 28. Dispatch unit 28 will provide four decoded instructions at a time along a bus 30, each instruction being provided to one of eight functional units 32–46. The dispatch unit will dispatch four such instructions each cycle, subject to checking for data dependencies and availability of the proper functional unit.

The first three functional units, the load/store unit 32 and the two integer ALU units 34 and 36, share a set of integer registers 48. Floating-point registers 50 are shared by floating point units 38, 40 and 42 and graphical units 44 and 46. Each of the integer and floating point functional unit groups have a corresponding completion unit, 52 and 54, respectively. The microprocessor also includes an on-chip data cache 56 and a data TLB 58.

Figure 2:
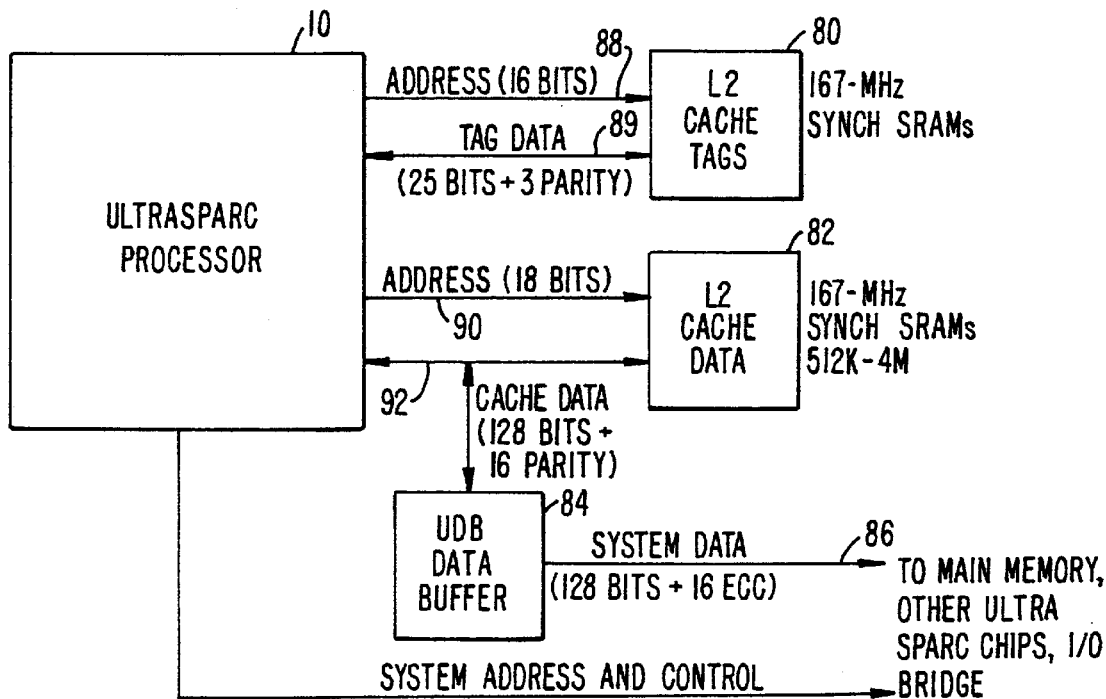
FIG. 2 is a block diagram of a computer system with a processor according to FIG. 1 and external cache memory.

FIG. 2 is a block diagram of a chipset including processor 10 of FIG. 1. Also shown are L 2 cache tags memory 80, and L 2 cache data memory 82. In addition, a data buffer 84 for connecting to the system data bus 86 is shown. In the example shown, a 16 -bit address bus 88 connects between processor 10 and tag memory 80, with the tag data being provided on a 28-bit tag data bus 89. An 18-bit address bus 90 connects to the data cache 82, with a 144-bit data bus 92 to read or write cache data.

Figure 3:
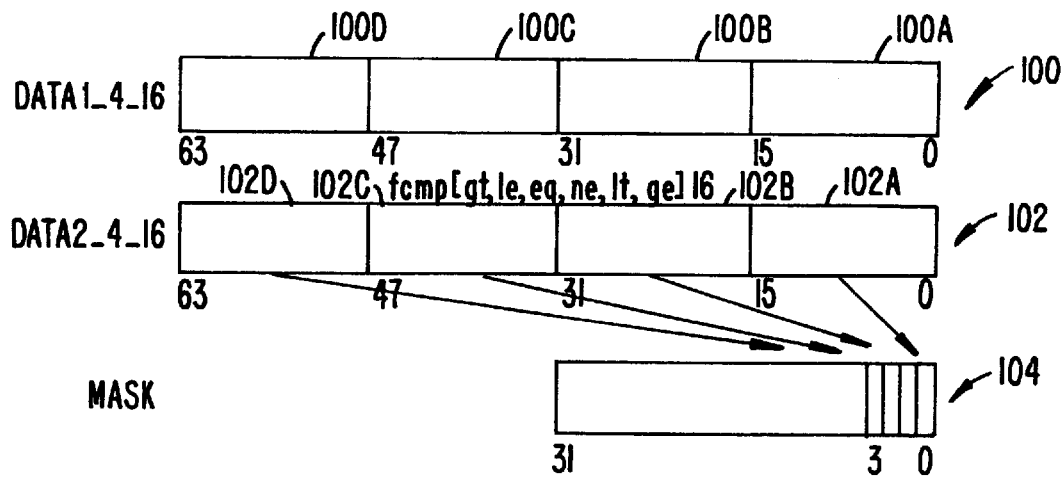
FIGS. 3 and 4 are diagrams illustrating comparison operations to generate a mask.
Figure 4:
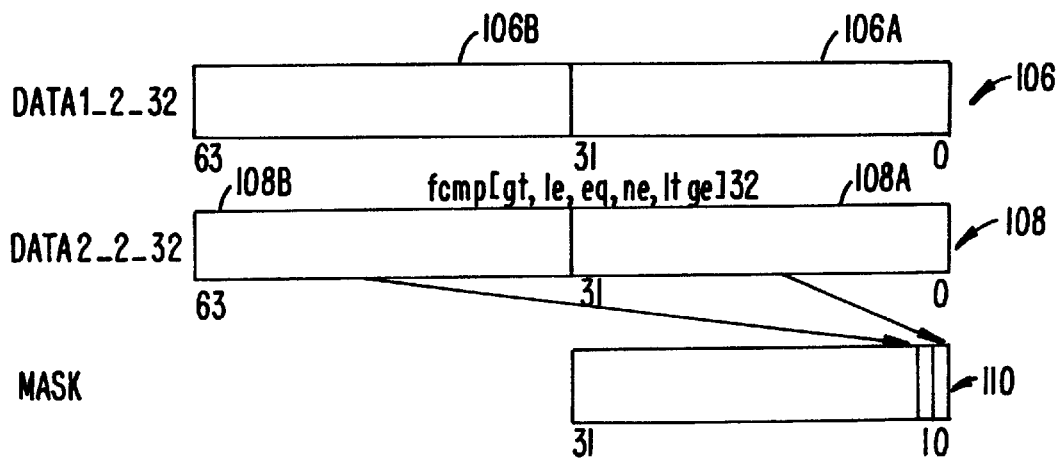

FIGS. 3 and 4 illustrate comparison operations for two different pixel data formats. In FIG. 3, a first register 100 has representations of four pixel addresses stored in 64 bits, representations 100A–D. A second register 102 also has four pixel addresses, 102A1 D. Each of the four pixel addresses in register 100 can be compared with those in register 102 simultaneously using comparison logic, preferably in integer ALU 36 of FIG. 1. The results of the comparison are written as four bits in a mask register 104. A single bit is used for each pixel comparison, and can indicate a desired logic relationship such as greater than (>), greater than or equal (≧), less than (<), less than or equal (≦), etc. Thus, for example, the pixel address in each of registers 100 and 102 may represent the Z buffer position, or depth of the pixel in a 3-D image. The resulting comparison and mask bit will indicate which pixel is in front of the other in the Z direction.

FIG. 4 illustrates an alternative pixel data format in which a register 106 has two 32-bit pixel address representations, 106A and 106B. A second register 108 has two pixel address representations 108A and 108B. The result of a comparison operation is stored in a mask register 110, which requires only two bits in this format. Preferably, all of the above registers, including the mask register, are designated registers in integer register file 48 of FIG. 1.

FIG. 5 illustrates a preferred format for the mask register. In this embodiment, rather than using the lowest four bits for one format as in FIG. 3, and the lowest two bits for another format as in FIG. 4, the mask has eight bits which are always updated. Those eight bits are indicated as corresponding to byte enable bits 0–7. In other words, the eight bits in the mask register correspond to enabling inputs for enabling a data path for bytes 0–7 of the 64 bit data path having eight bytes.

Three different pixel formats are shown in FIG. 5. PST 16 corresponds to the format of FIG. 3, while PST 32 corresponds to the format of FIG. 4. A third format, PST 8, corresponds to each pixel being represented by eight bits, which would have twice the number of pixel representations as in FIG. 3. As can be seen, for the PST 8 format, a single mask bit would be updated for each pixel comparison. For the PST 16 format, corresponding to FIG. 3, the comparison of pixel representations in 100A and 102A (pixel 0) would correspond to the two bytes, which thus updates both the zero and one byte enable bits in the mask. Thus, the 2 mask bits corresponding to the two bytes of the lower 16 bits of the data path are both updated to the desired value. Similarly, two bits are updated for each of the pixels 1, 2 and 3 corresponding to 100B, 100C and 100D of FIG. 3. Finally, for PST 32, only two pixels are compared at a time, with the first pixel comparison (pixel 0) updating the lower four byte enable mask bits, and the other pixel representation (pixel 1) updating the upper four bytes 4–7.

FIG. 6 is a diagram of one embodiment of the decode logic in load/store unit 32 of FIG. 1 for implementing aspects of the present invention. A mask register 112 is shown, which would be a register in the integer register as discussed above. Decode logic 114 is a standard decode logic circuit present in existing microprocessors which responds to an opcode and an instruction in the instruction register to enable different bytes on a write data path, by enabling buffers 116A–H for bytes 0–7. These data paths provide the data from a register in a register file to a memory at a designated address in response to a store instruction.

For a partial store instruction, a multiplexor 118, in response to a partial store instruction opcode (PST) will select the results of decode logic 120. Decode logic 120 uses the contents of mask register 112 which may be two bits (as in FIG. 4), four bits (as in FIG. 3) or eight bits for an eight-bit pixel representation. The decode logic remaps the mask bits, if necessary, into the format of FIG. 5. The PST type (PST 8, PST 16 and PST 32 ) is used to generate the table of FIG. 5 for providing byte enable outputs through multiplexor 118 to the individual byte enables of bytes 0–7. In an alternate embodiment, multiplexor 118 could be eliminated, and the remapping of FIG. 5 could be combined by combining decode logic 120 with decode logic 114 to generate an overall decoding map which includes a PST-type input and the mask register.

The partial store instruction of the present invention, in conjunction with the mask, can be used for multiple purposes. For instance, the mask can be written to to provide for writing to only selected channels of a multi-channel image. In addition, the mask can be used to indicate an image boundary, to avoid writing past the image boundary. Finally, the mask can be used to store the result of the comparison operation, as discussed above.

The partial store instruction and logic of the present invention can also be used for a prefetch operation. In one embodiment, this use of a prefetch takes advantage of a structure in which a cache memory is provided which is allocating. An allocating cache means that if an entry is not already in the cache when a write is attempted, the memory management for the cache (22 of FIG. 1) will cause the data at the specified address to be fetched from main memory and stored in the appropriate cache line, with that address being used as a tag for that cache line. Thus, a cache line will be allocated for that write operation. After the fetching, the write can then proceed. If, however, a write operation is specified with no data to be written, the end result is that the data is fetched into the cache, but is unchanged by the write. Thus, the write operation with no data enabled effectively performs a prefetch operation.

In a two-level cache structure, such as that set forth in FIG. 1, a prefetch can be selectively done into only the second level cache. This can be accomplished if the first level cache is a write-through, non-allocating cache. A non-allocating cache means that if the address is not present, a line will not be allocated and instead the write will go to the next level cache. The write-through portion of the description indicates that the write does indeed go to the next level cache.

Thus, programs can be written which know the direction of the data fetching, and can issue a prefetch instruction in advance of when the actual pixel data will be needed so that it will be available in the second level cache.

FIG. 7 illustrates the timing for one embodiment of operations for prefetching. At a time $P_1$, a prefetch instruction is issued, as a partial store with no enabling mask bits. In one configuration, this will fetch 64 bytes from main memory into the external cache (E$). At a subsequent time, $R_1$, eight of those bytes are fetched from the external cache into a register in a microprocessor for processing. At a subsequent time $C_1$, those eight bytes are processed in accordance with the desired computation in the microprocessor. By appropriately choosing the timing, a typical 6–7 cycle latency for bringing the eight bytes into the on-chip register can be used to time $R_1$ to be six or seven cycles in advance of $C_1$.

Since the fetch for main memory will bring in 64 bytes at a time in an external cache, this single fetch covers eight different fetches from the external cache into a register in the processor. Thus, such a prefetch instruction only needs to be done for every eighth operation, and accordingly its latency can be chosen to match.

Thus, by anticipating the access pattern of memory, pixel information can be loaded into the external cache, and then into the microprocessor itself just in advance of when it will be needed, thus improving memory access time and limiting the amount of cache memory needed to support graphics operations.

In addition, the use of a partial store instruction to accomplish this eliminates the need to add an additional operation code and corresponding decoding logic.

As can be seen from the timing diagram of FIG. 7, by appropriately timing the various fetches, a pipelining effect can be generated so that the next pixel data needed is always present without requiring any cycle stalls for fetching from main memory or from the external cache into the microprocessor.

As will be understood by those with skill in the art, the present invention may be embodied in other specific forms without departing from the spirit or essential characteristics thereof. For example, the comparison operation for generating the mask could be done in other than the integer unit, and another register file could be used, such as a separate, designated mask register or a floating point or graphics register file. Accordingly, the above disclosure is intended to be illustrative, but not limiting, of the scope of the invention which is set forth in the following claims.

What is claimed is:

1. A microprocessor comprising:

an execution unit;

a register file connected to said execution unit;

a mask register;

a load/store unit connected to said register file, said load/store unit including a plurality of groups of data gates coupled to a memory, a plurality of group enable control lines, each coupled to an enable input of one of said data gates, decode logic, having a first input coupled to said mask register, a second input responsive to a partial store instruction, and an output coupled to said plurality of group enable control lines, said decode logic being configured to selectively activate each of said group enable control lines in accordance with one or more of said mask register bits designated by said partial store instruction, such that multiple non-contiguous bytes in a register can be masked.

2. The microprocessor of claim 1 wherein said groups are bytes.

3. The microprocessor of claim 1 wherein said data gates are buffers.

4. The microprocessor of claim 1 wherein said execution unit includes comparison logic for comparing multiple pixel representations in each of two registers and writing a plurality of result bits in said mask register, comprising a single result bit for each of multiple pixel representations.

5. The microprocessor of claim 1 wherein said memory includes a first level cache on the same semiconductor chip as said microprocessor.

6. A microprocessor for performing graphics operations, comprising:

a register file;

a mask register;

an execution unit connected to said register file, said execution unit including comparison logic for comparing the multiple pixel representations in each of two registers in said register file and writing a plurality of result bits in said mask register, comprising a single result bit for each of multiple pixel representations;

a first level cache memory on the same semiconductor chip as said microprocessor;

a load/store unit connected to said register file, said load/store unit including a first level cache on the same semiconductor chip as said microprocessor;

a plurality of bytes of data buffers coupled to said cache memory, a plurality of byte enable control lines, each coupled to an enable input of one of said data buffers, decode logic, having a first input coupled to said mask register, a second input responsive to a partial store instruction, and an output coupled to said plurality of byte enable control lines, said decode logic being configured to selectively activate each of said byte enable control lines in accordance with one or more of said mask register bits designated by said partial store instruction, such that multiple non-contiguous bytes in a register can be masked;

wherein a number of bytes controlled by each bit of said mask register vary in accordance with a number of bytes for each pixel representation in a pixel format for said partial store instruction.

7. A computer system comprising:

a main memory;

a second level cache memory;

a microprocessor including a first level cache memory;

an execution unit;

a register file connected to said execution unit;

a mask register;

a load/store unit connected to said register file, said load/store unit including a plurality of groups of data gates coupled to said first level cache memory, a plurality of group enable control lines, each coupled to an enable input of one of said data gates, decode logic, having a first input coupled to said mask register, a second input responsive to a partial store instruction, and an output coupled to said plurality of group enable control lines, said decode logic being configured to selectively activate each of said group enable control lines in accordance with one or more of said mask register bits designated by said partial store instruction, such that multiple non-contiguous bytes in a register can be masked;

wherein a number of bytes controlled by each bit of said mask register vary in accordance with a number of bytes for each pixel representation in a pixel format for said partial store instruction.

8. The computer system of claim 7 further comprising a compiler for compiling a prefetch instruction as an opcode for writing a totally non-enabling mask into said mask register and a prefetch opcode for an address to be prefetched.

9. The computer system of claim 7 wherein said first level cache memory is a write-through, non-allocating cache memory.

10. The microprocessor of claim 1 wherein a number of bytes controlled by each bit of said mask register vary in accordance with a number of bytes for each pixel representation in a pixel format for said partial store instruction.

* * * * *